ABRAHAM REED, OF LOUISVILLE, KENTUCKY.

Letters Patent No. 88,075, dated March 23, 1869.

IMPROVED COMPOSITION FOR KINDLING FIRES.

The Schedule referred to in these Letters Patent and making part of the same.

*To all whom it may concern:*

Be it known that I, ABRAHAM REED, of the city of Louisville, county of Jefferson, and State of Kentucky, have invented a new and useful Invention, or Improvement in a Composition for Kindling Fires, as a substitute for kindling-wood; and I do hereby declare that the following is a full, clear, and exact description thereof, reference being had to the composition, and the ingredients composing the same.

The nature of my invention, or composition consists in a preparation composed of the following ingredients, in their relative proportions, as follows, viz:

Linseed-oil, four ounces.
Coal-oil, five ounces.
Pulverized charcoal, one pint.
Pulverized cannel coal, one-half pint.
Common tallow, two ounces.
Common rosin, five pounds.
Sawdust, a sufficient quantity to thicken it, but subject to variation, in the above proportions, to suit the temperature.

To enable others skilled in the art to make and use my invention, or composition, I will proceed to describe the manner in which it is prepared, and the ingredients of which it is composed, viz:

Linseed-oil, coal-oil, pulverized charcoal, pulverized cannel coal, common tallow, rosin, and sawdust.

The above is a description of the ingredients, and the composition is prepared by boiling the linseed-oil, coal-oil, tallow, and rosin together, and while hot, stir in the two kinds of pulverized coal, after which add a sufficient quantity of sawdust to form a thick, hard mass, when cold. When it is ready for use, it is easily ignited by the application of a match, and burns for a long time.

I do not claim anything as original in the ingredients of which the above is composed; but What I do claim as my invention, or composition, and desire to secure by Letters Patent, is—

The linseed-oil, the coal-oil, the pulverized charcoal, the pulverized cannel coal, the common tallow, the rosin, and the sawdust, when compounded, or prepared and used, for the purpose and in the manner set forth.

ABRAHAM REED.

Witnesses:
R. D. BUCHANAN,
C. W. FEARMAN.